UNITED STATES PATENT OFFICE

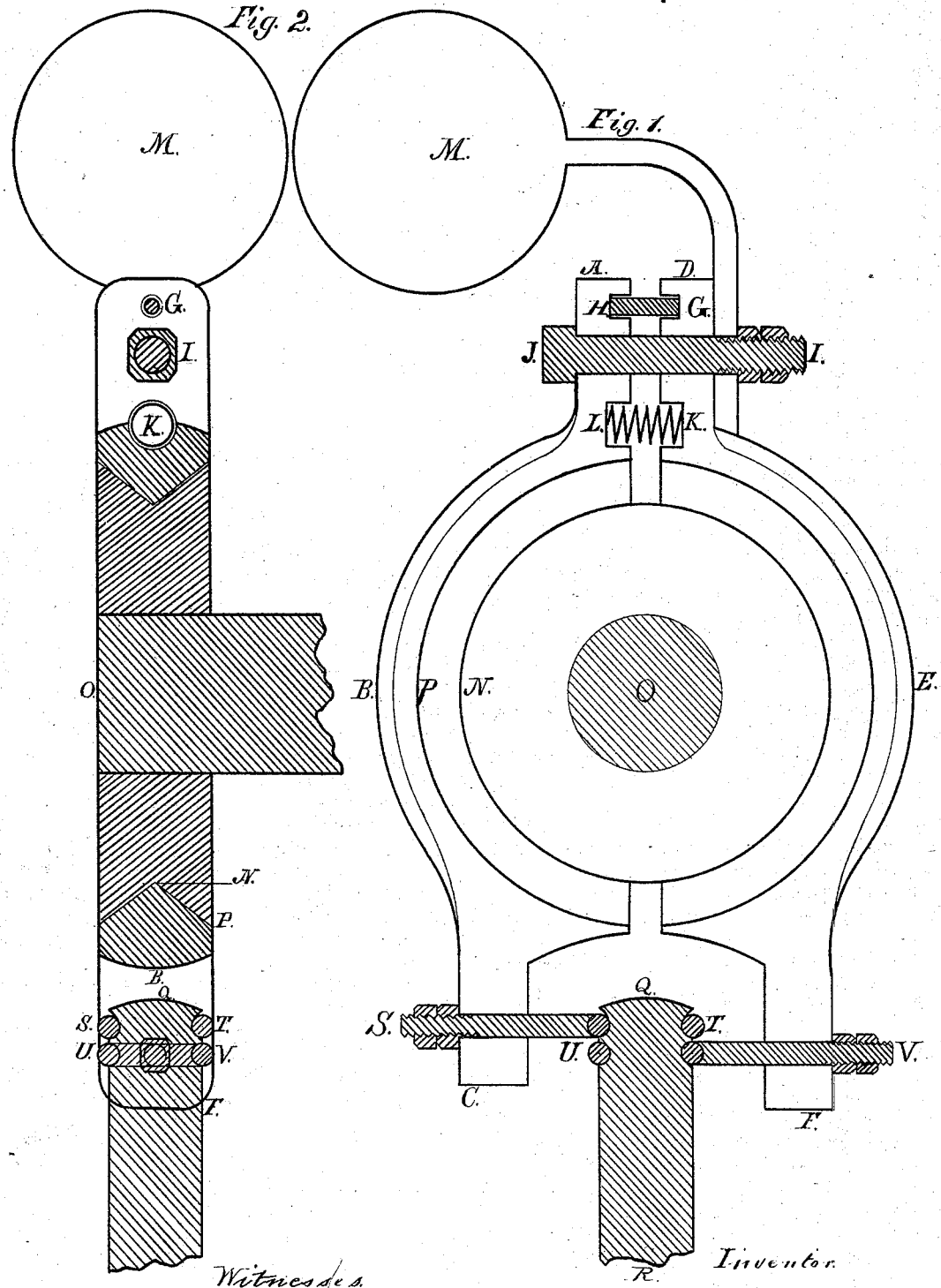

EZRA F. LANDIS, OF LANCASTER, PENNSYLVANIA.

IMPROVEMENT IN DEVICES FOR DRIVING MACHINERY.

Specification forming part of Letters Patent No. 219,585, dated September 16, 1879; application filed July 29, 1879.

*To all whom it may concern:*

Be it known that I, EZRA F. LANDIS, of Lancaster city, in the county of Lancaster and State of Pennsylvania, have invented a new and useful Improvement in Devices for Driving Machinery, which improvement is fully set forth in the following specification and accompanying drawings.

The object of my invention is to turn a revolving shaft with a lever by means of the friction between the shaft, or a pulley attached thereto, and a band consisting of one or more parts encircling the same.

The arrangement is illustrated in detail in the accompanying drawings.

Figures 1 and 2 represent, respectively, a side view and a vertical section of a pulley fixed on the end of a shaft and made to revolve by means of my invention.

In the drawings corresponding parts in the two figures are represented by the same letters.

O is the center of the shaft, and P the outside rim of the pulley.

The band is in two parts, A B C and D E F, and in this case lies in a V-shaped groove formed around the pulley.

Q R is a lever, connected to the lower portion of the band by the link T S, and to the upper portion by the link U V.

When the lever Q R is lowered, the two parts of the band are drawn together and clasp the pulley sufficiently tight that the friction between it and the pulley will not allow one to slide on the other, and the shaft will evidently turn.

When the lever is raised the spiral spring K L throws the two parts of the band away from the pulley, allowing it to continue its motion, and the weight M, attached to the upper portion of the band, throws the lever side of the band upward until the downward pull of the lever again tightens the band, and a new impulse is given to the pulley and shaft.

The links S T and U V being movable in the lugs of the band, the lever is not confined to the plane of the pulley, but has a swing to either side, similar to the lever of the bellows of a blacksmith's forge.

I am aware that friction-clutches acting on this principle are used for brakes in hoisting apparatus and other machinery, and also for driving machinery of various kinds, by shifting pulleys or other devices, in order to connect the parts to a shaft or machinery already in motion; but in my invention there is no other power necessary, and the entire machine is put in motion by the direct action of the lever and clutch.

What I claim as new in my invention, and wish to obtain Letters Patent for, is—

The device, as set forth, in combination with the lever Q R, the links or eyebolts S T and U V, the spring K L, and the weight or spring M, as and for the purpose set forth.

EZRA F. LANDIS.

Witnesses:
ALLAN A. HERR,
J. E. HERR.